United States Patent
Zhang et al.

(10) Patent No.: US 12,556,979 B2
(45) Date of Patent: Feb. 17, 2026

(54) FAST WI-FI ROAMING

(71) Applicant: Hewlett Packard Enterprise Development LP, Spring, TX (US)

(72) Inventors: Xuanhe Zhang, Beijing (CN); Haifeng Zhang, Beijing (CN); Hong Song, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 262 days.

(21) Appl. No.: 18/141,139

(22) Filed: Apr. 28, 2023

(65) Prior Publication Data

US 2024/0365179 A1 Oct. 31, 2024

(51) Int. Cl.
*H04W 36/00* (2009.01)

(52) U.S. Cl.
CPC . *H04W 36/0016* (2013.01); *H04W 36/00835* (2018.08); *H04W 36/037* (2023.05)

(58) Field of Classification Search
CPC ....... H04W 36/0016; H04W 36/00835; H04W 36/037; H04W 36/18; H04W 36/026; H04W 84/12
See application file for complete search history.

(56) References Cited

U.S. PATENT DOCUMENTS

| | | |
|---|---|---|
| 9,084,111 B2 | 7/2015 | Narasimhan et al. |
| 10,069,647 B2 | 9/2018 | Dronadula et al. |
| 2013/0196708 A1 | 8/2013 | Narasimhan et al. |
| 2013/0305332 A1 | 11/2013 | Narasimhan et al. |
| 2018/0183662 A1* | 6/2018 | Likar .................. H04L 41/0883 |

OTHER PUBLICATIONS

Alvaro Tellez, "Key Management: Roaming in AOS10," Excerpt from AOS10 Webinar, available online at <<https://parmonic.ai/hpe/lp/webinar/e3d892e355218ab9>, Sep. 2022, 23 pages.

Cisco Systems, Inc., "Opportunistic Key Caching," in Cisco Catalyst 9800 Series Wireless Controller Software Configuration Guide, Cisco IOS XE 17.10.x, Nov. 30, 2022, <https://www.cisco.com/c/en/us/td/docs/wireless/ controller/9800/17-10/config-guide/b_wl_17_10_cg/m_okc.html>, 3 pages.

(Continued)

*Primary Examiner* — Jamal Javaid
(74) *Attorney, Agent, or Firm* — Yao Legal Services, Inc.

(57) ABSTRACT

One aspect can provide a system and method for fast Wi-Fi roaming. The system can identify forwarding data associated with a first active session of a first application running on a client device coupled to a home access point (AP), determine a number of neighboring APs comprising a target AP, maintain a roaming cache on each of the neighboring APs, and synchronize the identified forwarding data associated with the first active session to the roaming cache on each neighboring AP. In response to determining that the client device is roaming to the target AP, the system can access the roaming cache on the target AP to obtain the forwarding data associated with the first active session in order to continue the first active session on the client device with reduced roaming latency, thereby facilitating fast roaming of the client device from the home AP to the target AP.

20 Claims, 7 Drawing Sheets

(56) References Cited

OTHER PUBLICATIONS

Wikipedia, "IEEE 802.11r-2008," Feb. 23, 2023 <https://en.wikipedia.org/w/index.php?title=IEEE_802.11r-2008&oldid=1141750249>, 2 pages.
Cisco Systems, Inc., "Ascertain Methods for 802.11 WLAN and Fast-Secure Roaming on CUWN," Feb. 9, 2023, <https://www.cisco.com/c/en/us/support/docs/wireless-mobility/wireless-lan-wlan/116493-technote-technology-00.html>, 55 pages.
Preyas Hathi, "Roaming in Wi-Fi Networks," Apr. 20, 2023, <https://arista.my.site.com/AristaCommunity/s/article/Roaming-in-Wi-Fi-Networks>, 8 pages.
Jason Hintersteiner, "WiFi Fast Roaming, Simplified," May 22, 2016, <https://www.networkcomputing.com/wi-fi/wifi-fast-roaming-simplified>, 3 pages.
Wikipedia, "IEEE 802.11," Feb. 5, 2023, <https://en.wikipedia.org/w/index.php?title=IEEE_802.11&oldid=1137644912>, 22 pages.
Doezer et al., "What is the purpose of both 802.11 re-authentication and re-association while roaming?," Jun. 12, 2020, superuser.com, <https://superuser.com/questions/1091250/what-is-the-purpose-of-both-802-11-re-authentication-and-re-association-while-ro>, 3 pages.
Esupport, "Network Address Translation - Overview," Feb. 13, 2019, Controller Based WLANs, <https://community.arubanetworks.com/community-home/librarydocuments/viewdocument?DocumentKey=82855df2-8c05-4cf7-b85b-5564a9d49b18&CommunityKey=39a6bdf4-2376-46f9-853a-49420d2d0caa&tab=librarydocuments>, 7 pages.
Tabassam et al., "Fast and Seamless Handover for Secure Mobile Industrial Applications with 802.11r," Oct. 2009, The 5th IEEE International Workshop on Performance and Management of Wireless and Mobile Networks (P2MNET 2009) Zurich, Switzerland, Oct. 20-23, 2009, pp. 750-757.

\* cited by examiner

FAST WI-FI ROAMING

BACKGROUND

Field

This disclosure is generally related to wireless networks. More specifically, this disclosure is related to reducing latency associated with Wi-Fi roaming.

BRIEF DESCRIPTION OF THE FIGURES

In the figures, like reference numerals refer to the same figure elements.

DETAILED DESCRIPTION

Figure 1:
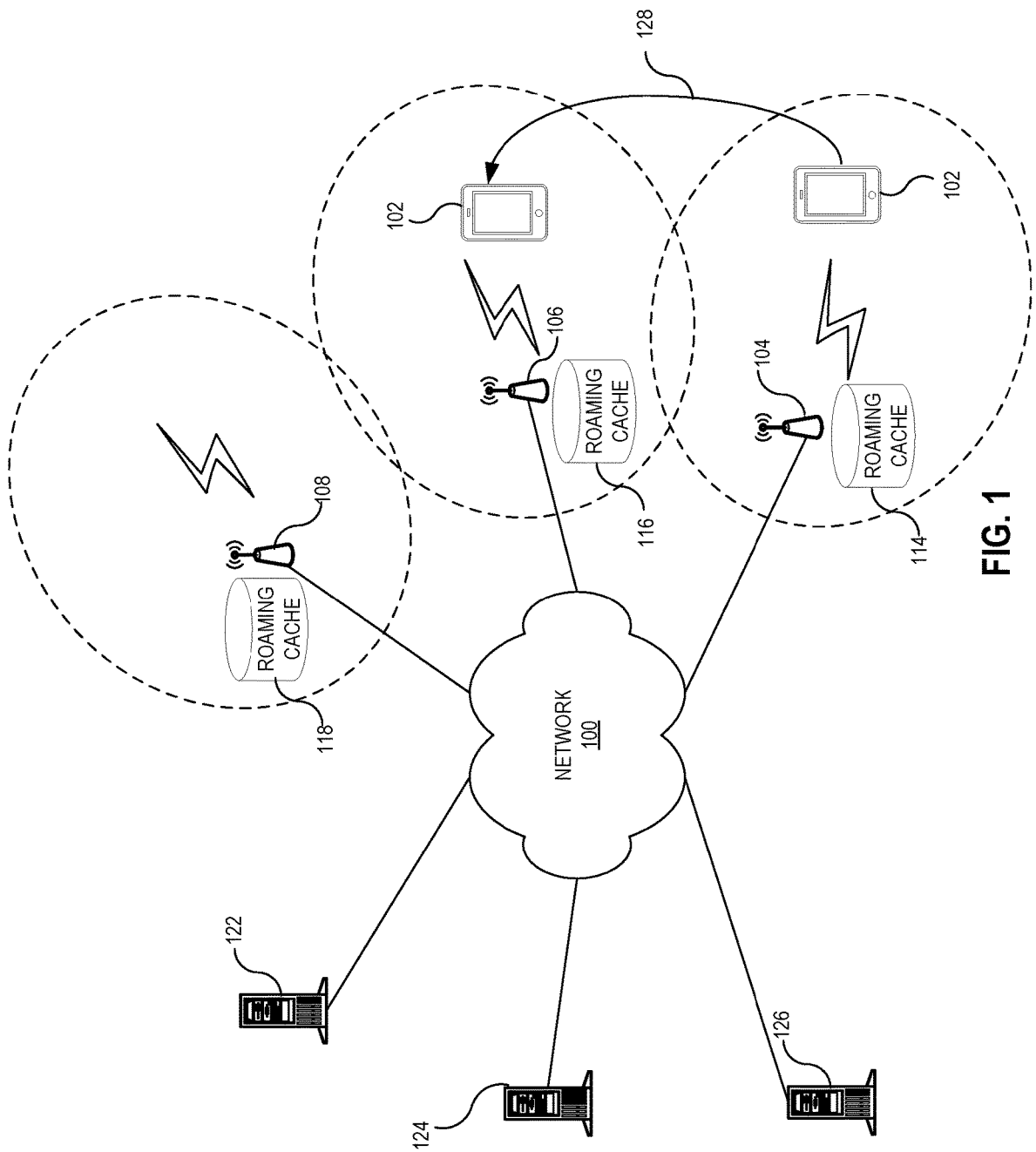
FIG. 1 illustrates an example of a network environment that facilitates fast Wi-Fi roaming, according to one aspect of the instant application.

Wi-Fi roaming is a process in which a mobile device (e.g., a smartphone or a laptop computer) seamlessly switches from one Wi-Fi access point (AP) to another as the user moves from one location to another within the range of a wireless network. When a device moves out of the range of a currently coupled AP (referred to as the home AP), it searches for and couples to the next available AP with the strongest signal. The newly coupled AP can be referred to as the target AP. The roaming process occurs automatically and is designed to provide uninterrupted connectivity for the user's online activities. More specifically, to prevent interruption of the user's online activities (e.g., webpage browsing, video/audio streaming, video/audio conferencing, etc.) while the mobile device roams from the home AP to the target AP, session data associated with each open connection may be synchronized from the home AP to the target AP such that each session can be continuously maintained. Synchronizing the session data can take time and increase roaming latency. Different user applications may be affected differently by the roaming latency.

Applications that are less sensitive to timing (e.g., browsing text- or graphic-based webpages) can be more tolerant of roaming latency, meaning that the roaming latency does not negatively affect the user experience. However, applications that require more accurate time synchronization (e.g., Voice over Internet Protocol (VoIP) applications, audio- or video-conferencing applications, online-gaming applications, etc.) would require much higher roaming performance, and reducing the roaming latency can be essential in ensuring satisfactory user experience. To reduce the roaming latency, according to some aspects of the instant application, session data associated with applications requiring higher roaming performance can be preemptively synchronized to a roaming cache of neighboring APs.

In a conventional Wi-Fi network, when a mobile device (also referred to as a "mobile station" or simply a "station") moves out of the range of the home AP and moves into the range of a target AP, the mobile device can initiate an association with the target AP. Note that before a mobile device or station can send traffic through an AP, it should be authenticated and associated with the AP. The target AP can broadcast a Layer 2 (L2) session-request message to all APs on the network (e.g., the client virtual local area network (VLAN)). In response to receiving the broadcast session-request message, the home AP can send an L2 unicast session-response message carrying data associated with the mobile device (e.g., the datapath session data and the Domain Name System (DNS) mapping table) to the target AP. Upon receiving the session-response message, the target AP can use the session data to continue those sessions for the mobile device. The target and home APs can subsequently exchange move-request and move-response messages and send report messages to the network-management entity to complete the roaming process. The network-management entity or service can reside on a remote server or in the cloud. In one example, the home AP can encapsulate client-related data (e.g., credentials for accessing the network) in the move-response message sent to the target AP.

A successful roaming process requires two types of data to be synchronized between the home AP and the target AP, the forwarding data (e.g., the session data and the DNS address mapping information) in the forwarding layer and the client-related data in the application layer, with both types of data referred as the roaming data. Synchronizing the forwarding data enables the target AP to continue forwarding traffic for active sessions on the mobile device, and synchronizing the client-related data allows the target AP to authenticate the mobile device. In conventional approaches, synchronization of the forwarding data relies on the L2 session-response message sent from the home AP to the target AP. L2 messages can be unreliable, and lost packets will not be retransmitted. When a mobile device has many active sessions, there might be a relatively large amount of data (which can occupy multiple L2 packets) to be transferred from the home AP to the target AP. Transferring a large amount of data using the L2 packets may significantly increase the roaming latency and negatively affect the user experience for certain applications. In addition, lost L2 packets may result in the interruption or failure of the roaming process. For example, the target AP may not receive the session-response message from the home AP and would consider the mobile device as a new client instead of a roaming client. To improve the roaming performance, according to some aspects, a copy of the client-related data and the forwarding data can be preemptively transferred to the neighboring APs of the home AP such that the target AP can access, during roaming, the copy without having to wait for the home AP to send such data. Conventional fast-roaming approaches, such as Opportunistic Key Caching (OKC) and the IEEE 802.11r standard, can reduce the roaming delay by pre-authenticating clients. However, the conventional fast-roaming approaches do not address the roaming delay resulting from the synchronization of the forwarding data.

FIG. 1 illustrates an example of a network environment that facilitates fast Wi-Fi roaming, according to one aspect of the instant application. FIG. 1 shows a mobile device 102 coupled to application servers 122, 124, and 126 via an AP 104 and a network 100. Mobile device 102 can access various applications provided by servers 122, 124, and 126, including but not limited to: webpage browsing, video or audio streaming, VoIP, video conference, online gaming, etc. FIG. 1 also shows additional APs 106 and 108 coupled to network 100. Each of APs 104-108 may be a combination of hardware, software, and/or firmware that is configured to provide wireless network connectivity to wireless client devices, such as mobile device 102.

AP 104 maintains a datapath session table that stores the session data for mobile device 102 to access the services provided by application servers 122-126. For example, AP 104 can include a table entry for each active session on mobile device 102, and the table entry can include information about the connection, such as the source and destination IP addresses, port numbers, protocol used, priority, type of service (ToS), and other parameters. The session table is typically updated dynamically as new sessions are established and existing sessions are terminated. AP 104 can also store client-related data used to authenticate mobile device 102.

When mobile device 102 travels from the coverage area of AP 104 to the coverage area of AP 106 (as shown by arrow 128), AP 104 is to transfer the session data of mobile device 102 to AP 106. In conventional networks, the session data can be encapsulated in an L2 session-response message sent from AP 104 to AP 106, and the client-related data can be encapsulated in a move-response message. As discussed previously, using the L2 session-response message to transfer the session data may be unreliable and can result in a large roaming delay, which can be undesirable for traffic requiring high roaming performance.

In addition to the dynamic session data, the roaming process also requires the transfer of client-related data from the home AP to the target AP. The client-related data (e.g., the credentials to access the network) can be determined based on the service set identifier (SSID) of the network to which the client device belongs and the Media Access Control (MAC) address of the client device. In conventional approaches, the client-related data can be encapsulated in a move-response message sent from the home AP to the target AP. Unlike the time-varying session data, the client-related data for a particular client device can be static.

To reduce the roaming delay, according to some aspects, each AP can maintain a roaming cache. For example, AP 104 maintains a roaming cache 114, AP 106 maintains a roaming cache 116, and AP 108 maintains a roaming cache 118. Each roaming cache can store the session data as well as the client-related data for mobile devices that may potentially roam to the AP. In the example shown in FIG. 1, while mobile device 102 is still coupled to AP 104, AP 104 can preemptively send a copy of the session data and the client-related data associated with mobile device 102 to AP 106 for storage in roaming cache 116. Each roaming cache can be implemented in a memory attached to the processor of each AP. Other types of storage devices can also be used to implement the roaming cache.

When mobile device 102 travels out of the range of AP 104 and determines (e.g., based on the signal strength) that AP 106 is the roaming target, mobile device 102 can initiate an association with AP 106. In response to the association request, AP 106 can examine roaming cache 116 to determine whether roaming cache 116 contains client-related data for mobile device 102. If so, AP 106 can read the client-related data and the corresponding forwarding data from roaming cache 116. AP 106 can use the client-related data to create the client information and use the forwarding data to create forwarding entries. This allows AP 106 to continue the active sessions on mobile device 102 (e.g., by forwarding packets to the correct destinations) without AP 104 having to send the client-related data and the session data, thus significantly reducing the roaming latency for those particular sessions. On the other hand, if roaming cache 116 does not include the client-related data for mobile device 102, AP 106 is to wait for AP 104 to send the client-related data (e.g., via a move-response message) and the forwarding data (e.g., via a session-response message).

Because the forwarding data includes dynamic session data, it should be synchronized dynamically. Each time a new session is created, or an old session is deleted, the forwarding data is to be synchronized to the neighboring APs. Moreover, the forwarding data may be periodically synchronized to keep the sessions alive. Note that dynamic synchronization of the forwarding data for all active sessions can consume a large amount of bandwidth and may be burdensome to the network. Considering that not all applications are sensitive to roaming latency, according to some aspects of the instant application, an AP may exclusively synchronize forwarding data associated with applications requiring high roaming performance to neighboring APs. In other words, instead of sending a copy of the forwarding data for all applications currently running on an AP, the AP may send, to its neighboring APs, a copy of the forwarding data for a few applications exclusively, such as the VoIP application, the video-conferencing application, and the online gaming applications. These applications can be referred to as fast-roaming applications.

Upon detecting a roaming client, a target AP can access its roaming cache to obtain forwarding data associated with the roaming client and start to forward packets for the fast-roaming applications right away, without waiting for the L2 session-response message from the home AP. The reduced roaming delay for the fast-roaming applications can enhance the user experience during roaming. On the other hand, forwarding data associated with other applications (e.g., webpage browsing, streaming, etc.) will be synchronized from the home AP to the target AP normally (i.e., via an L2 unicast session-response message). Because the other applications are less sensitive to roaming delay, the user would not notice the difference. Note that the static client-related data (e.g., the network-access credentials) can always be preemptively synchronized to the neighboring APs.

According to some aspects of the instant application, forwarding data associated with applications requiring high roaming performance can be identified and flagged as "fast-roaming" data. Each AP can periodically send L2 broadcast messages (referred to as fast-roaming messages) that encapsulate the fast-roaming data to neighboring APs. According to one aspect, each AP can periodically broadcast fast-roaming messages with time intervals between 30 seconds and one minute. Moreover, an AP can broadcast a fast-roaming message each time its forwarding data is updated (e.g., the session table is updated). The format of a fast-roaming message can be similar to the session-response message sent from a home AP to a target AP.

Various mechanisms can be used to identify and flag the fast-roaming data. According to some aspects, different types of traffic filters can be applied to the forwarding data maintained by the AP to filter out the fast-roaming data. One type of filter can be based on the IP address of the destination server, one type of filter can be based on the domain name, and one type of filter can be based on the name of the application. Using a video-conferencing application as an example, entries in the datapath session table can be filtered based on the destination or source IP address. If the destination or source IP address of a table entry matches the IP address of a known video-conferencing server, the table entry is flagged as fast-roaming data. Similarly, forwarding data associated with the domain name of the video-conferencing service can be flagged as fast-roaming data. In devices implementing a deep packet inspection (DPI) technology (e.g., Aruba AirSlice), the forwarding data for each application (e.g., the video-conferencing application) can be identified intelligently, and data associated with the video-conferencing application can be flagged as fast roaming data.

According to some aspects of the instant application, the filters can be applied using access-control lists (ACLs) assigned to the role of the client device (i.e., the mobile device or station). Such ACLs can also be referred to as fast-roaming ACLs and can be configured in the role of the client (e.g., an employee role or a guest role). For example, the fast-roaming ACLs can be added to the client role profile. According to some aspects, the fast-roaming ACLs can include one or more of: a destination-server-based ACL, a domain-name-based ACL, and an application-name-based ACL.

A destination-server-based ACL can be used to specify forwarding data associated with a particular IP address. For example, a destination-server-based ACL can be expressed as: rule any any match tcp any 10.1.1.41 permit fast-roaming. This ACL specifies that forwarding data for traffic sent from the client to an IP address 10.1.1.41 (or sent from 10.1.1.41 to the client) using the TCP protocol is flagged as fast-roaming data. According to one aspect, a plurality of destination-server-based ACLs can be used to identify forwarding data associated with a plurality of IP addresses. For example, different video-conferencing servers can have different IP addresses, and each IP address can correspond to an ACL.

A domain-name-based ACL can be used to specify forwarding data associated with a particular domain name. For example, a domain-name-based ACL can be expressed as: rule alias *.skypy.com match any any permit fast-roaming. This ACL specifies that forwarding data for traffic sent from the client to a web address *.skype.com (or vice versa) using the UDP or TCP protocol is flagged as fast-roaming data. A plurality of domain-name-based ACLs can be used to identify forwarding data associated with a plurality of different domain names. For example, different video-conferencing services can have different domain names, and each domain name can correspond to an ACL.

The application-name-based ACL can be used to specify forwarding data associated with a particular application name. For example, an application-name-based ACL can be expressed as: rule any any match app zoom permit fast-roaming. This ACL specifies that all forwarding data belonging to the Zoom application is flagged as fast-roaming data. A plurality of application-name-based ACLs can be used to identify forwarding data associated with a plurality of different applications. For example, different video-conferencing applications can correspond to different ACLs.

The ACLs can be user configurable. According to some aspects, the user of the client device can be presented with a user interface to allow the user to specify traffic or applications that require fast roaming. In one example, a user can manually add a number of IP addresses, domain names, or application names, and the system can automatically generate the ACLs to be included in the profile of the client role. In another example, the user may specify what type of service or application requires fast roaming, and the system can determine IP addresses, domain names, or application names corresponding to the specified type of service or application. For example, if the user specifies that video conference is a type of service requiring fast roaming, the system can determine that "*.skype.com" and "*.zoom.com" are domain names associated with video-conferencing services and generate ACLs correspondingly. Alternatively, the system can use DPI technology to identify traffic associated with video-conferencing applications.

The client-related data is always flagged as fast-roaming data because it is for authenticating the client device. Once the fast-roaming data is identified, the AP can periodically forward a copy of the fast-roaming data to its neighboring APs. For example, the AP can obtain a neighbor list from the network-management service that manages all APs in the network and can forward a copy of the fast-roaming data to all APs on the neighbor list. According to some aspects, the client-related data can be encapsulated in a Process Application Programming Interface (PAPI) message or a Datagram Transport Layer Security (DTLS) PAPI message, and the PAPI message can be sent to the APs on the neighbor list, one AP at a time. On the other hand, the fast-roaming forwarding data can be encapsulated in L2 fast-roaming messages and broadcast to all APs on the neighbor list. Each neighboring AP can store the received fast-roaming data in its roaming cache. According to some aspects, the fast-roaming data for each client device can be indexed using the MAC address of the client device.

In the example shown in FIG. 1, only one mobile device (i.e., device 102) is coupled to AP 104, and AP 104 can preemptively synchronize the fast-roaming data (including the client-related data and the forwarding data) of mobile device 102 to APs 106 and 108. In practice, each AP may be coupled to many mobile devices, depending on the user density and the capacity of the AP, and any mobile device may roam at any time. Consequently, each AP may preemptively synchronize, to all its neighboring APs, the fast-roaming data of all coupled mobile devices.

Figure 2:
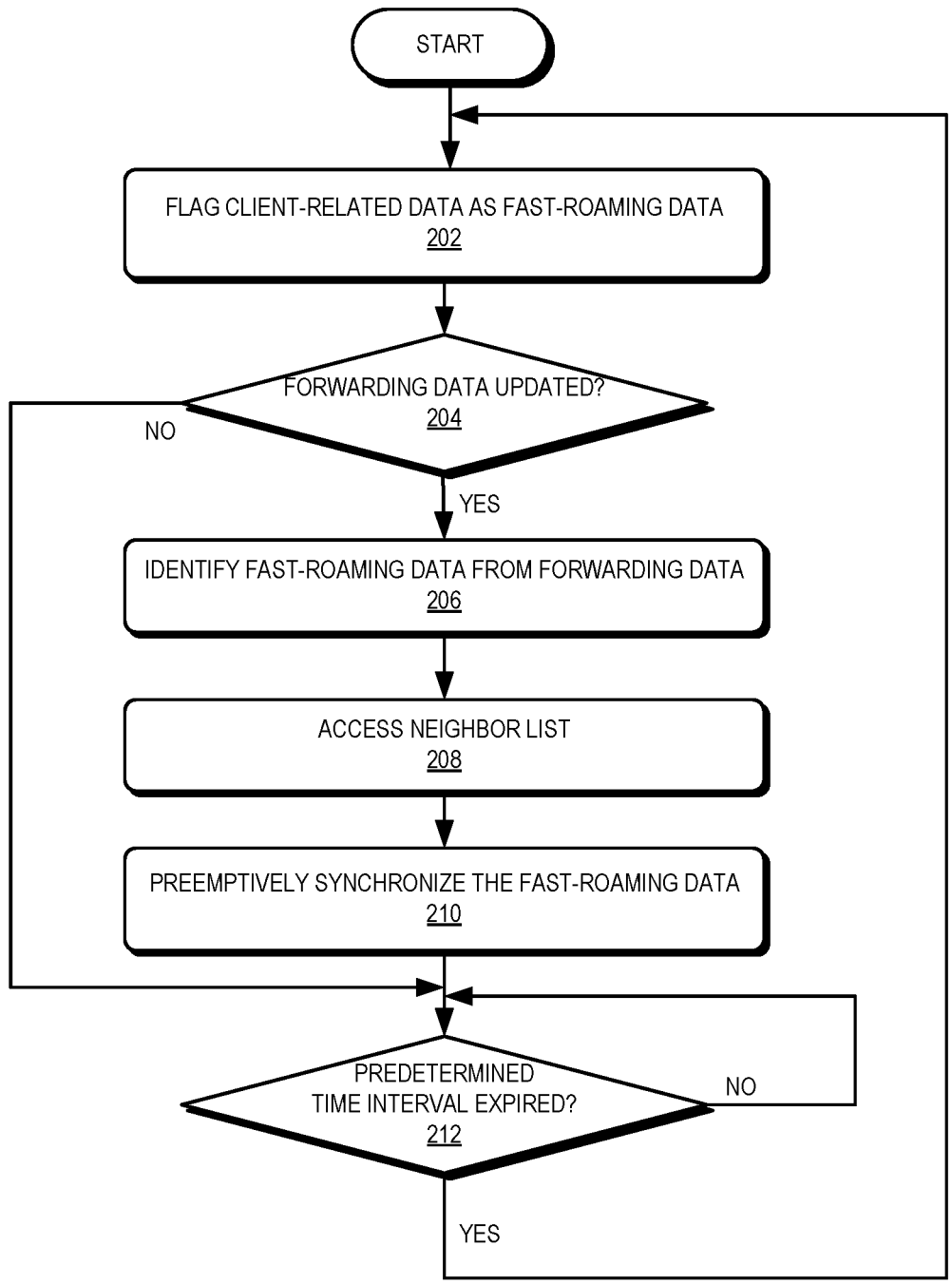
FIG. 2 illustrates an example of a process for preemptively synchronizing fast-roaming data, according to one aspect of the instant application.

FIG. 2 illustrates an example of a process for preemptively synchronizing fast-roaming data, according to one aspect of the instant application. The process can start with the AP flagging all client-related data as fast-roaming data (operation 202). As discussed previously, client-related data can include credentials (e.g., a network security key) to access a certain network. The AP may determine whether the forwarding data for coupled mobile devices has been updated (operation 204). Note that the forwarding data can include the session data, and the creation and deletion of a session can cause the session data to be updated. In other words, the forwarding data is updated each time a coupled mobile device launches or terminates an application.

In response to determining that the forwarding data has been updated, the AP can identify fast-roaming data from the forwarding data (operation 206). According to some aspects, the fast-roaming forwarding data can include the forwarding data (e.g., session data and DNS address mapping information) related to traffic requiring high-roaming performance. Examples of traffic requiring high roaming performance can include voice traffic, audio- or video-conferencing traffic, online-gaming traffic, etc. Identifying the fast-roaming forwarding data can include applying various traffic filters. Examples of the traffic filters can include IP-address-based filters, domain-name-based filters, and application-name-based filters. The filters can be implemented using the ACLs configured in the client role. The AP can flag the identified forwarding data as fast-roaming data.

Subsequent to identifying and flagging the fast-roaming data, the AP can access a neighbor list to determine the neighboring APs (operation 208). The neighbor list can be generated by the network-management service (e.g., during the deployment of the APs) and stored on the AP. The AP can then preemptively synchronize the fast-roaming data to all APs on the neighbor list (operation 210).

If the forwarding data is not updated, the AP determines whether a predetermined time interval has expired (operation 212). If not, the AP waits for the expiration of the time interval. If the time interval expires, the process repeats by returning to operation 202. The client-related information and the forwarding information are dynamic, and the synchronization of the fast-roaming data may be performed periodically. Timely synchronization of the fast-roaming data can enhance the roaming performance for applications that use the fast-roaming data. The frequency of the synchronization can be configurable and can depend on the network traffic load capacity. According to one aspect, the predetermined time interval can be between 30 seconds and one minute. Because only a small portion of the forwarding data is flagged as fast-roaming and requires periodical synchronization, the bandwidth consumption resulting from the periodical data synchronization can be relatively low.

Figure 3A:
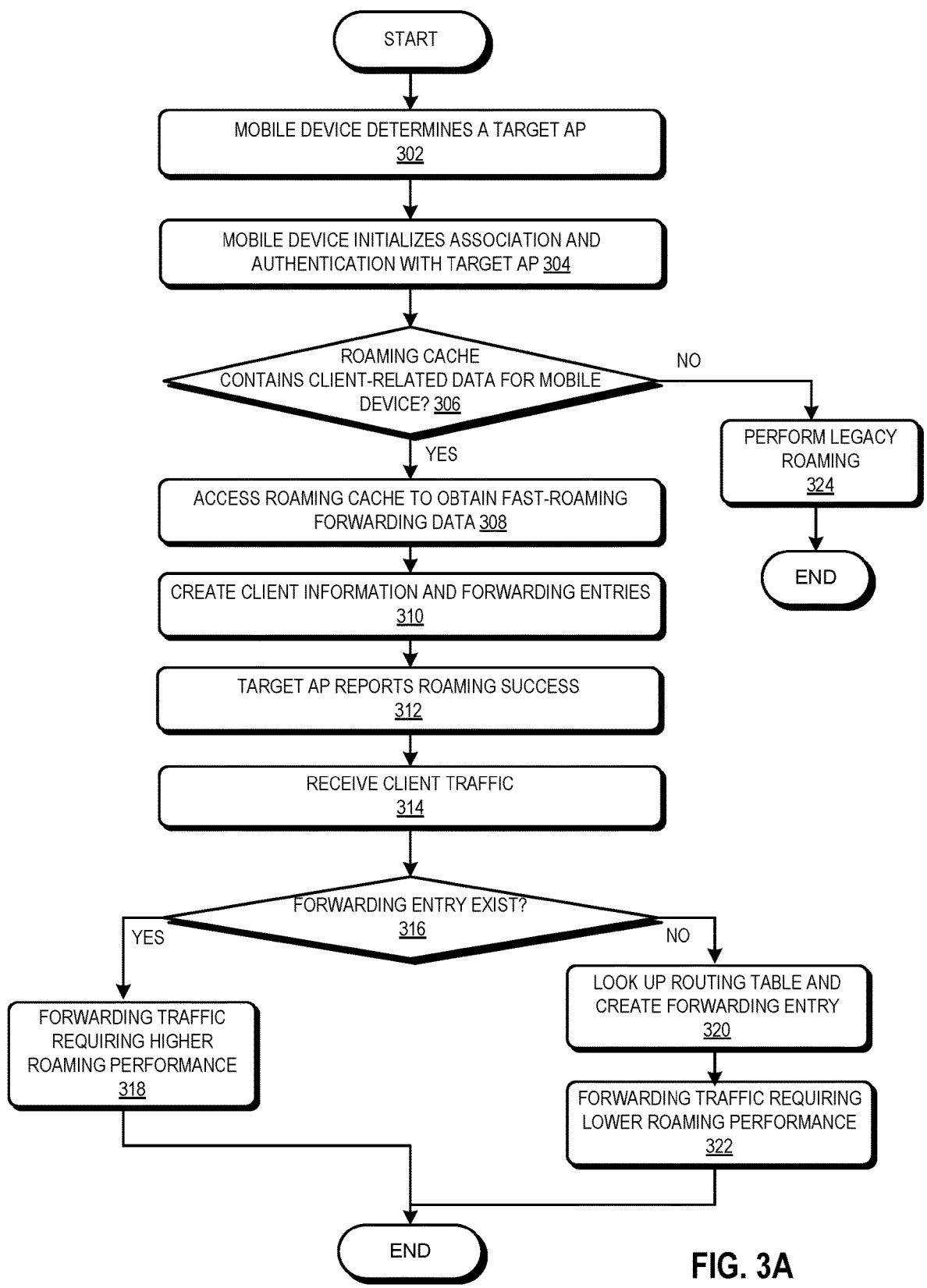
FIG. 3A illustrates an example of a roaming process, according to one aspect of the instant application.

FIG. 3A illustrates an example of a roaming process, according to one aspect of the instant application. During operation, a mobile device determines a target AP based on the received signal strength indicator (RSSI) as it is moving out of the coverage range of the home AP (operation 302). The mobile device initiates association and authentication with the target AP (operation 304).

In response to the association request, the target AP checks its roaming cache to determine whether it contains client-related data for the roaming mobile device (operation 306). The target AP can search the roaming cache based on the SSID and the MAC address of the mobile device. If the roaming cache of the target AP contains the client-related data for the roaming device, the target AP can access the roaming cache to obtain the fast-roaming forwarding data for the mobile device based on the MAC address of the mobile device (operation 308).

The target AP can subsequently create client information and forwarding entries for the mobile device based on the client-related data and the fast-roaming forwarding data (operation 310). For example, the target AP can copy the fast-roaming forwarding data in the roaming cache to its datapath table. The target AP can subsequently send a report message to the network-management service to report the success of the roaming event (operation 312).

The target AP can receive client traffic associated with the mobile device (operation 314). In response, the target AP can look up its datapath table to determine whether a forwarding entry associated with the client traffic exists (operation 316). Note that, at this moment, the target AP only has forwarding entries for traffic requiring higher roaming performance. If the target AP has a forwarding entry corresponding to the traffic (meaning that the traffic requires higher roaming performance), the target AP can forward the traffic requiring higher roaming performance according to the forwarding entry found in its datapath table (operation 318). If the target AP does not have the forwarding entry corresponding to the traffic (meaning that the traffic requires lower roaming performance), the target AP can look up the routing table and create a forwarding entry for the traffic requiring lower roaming performance (operation 320). The target AP can subsequently forward the traffic requiring lower roaming performance according to the created forwarding entry (operation 322).

Figure 3B:
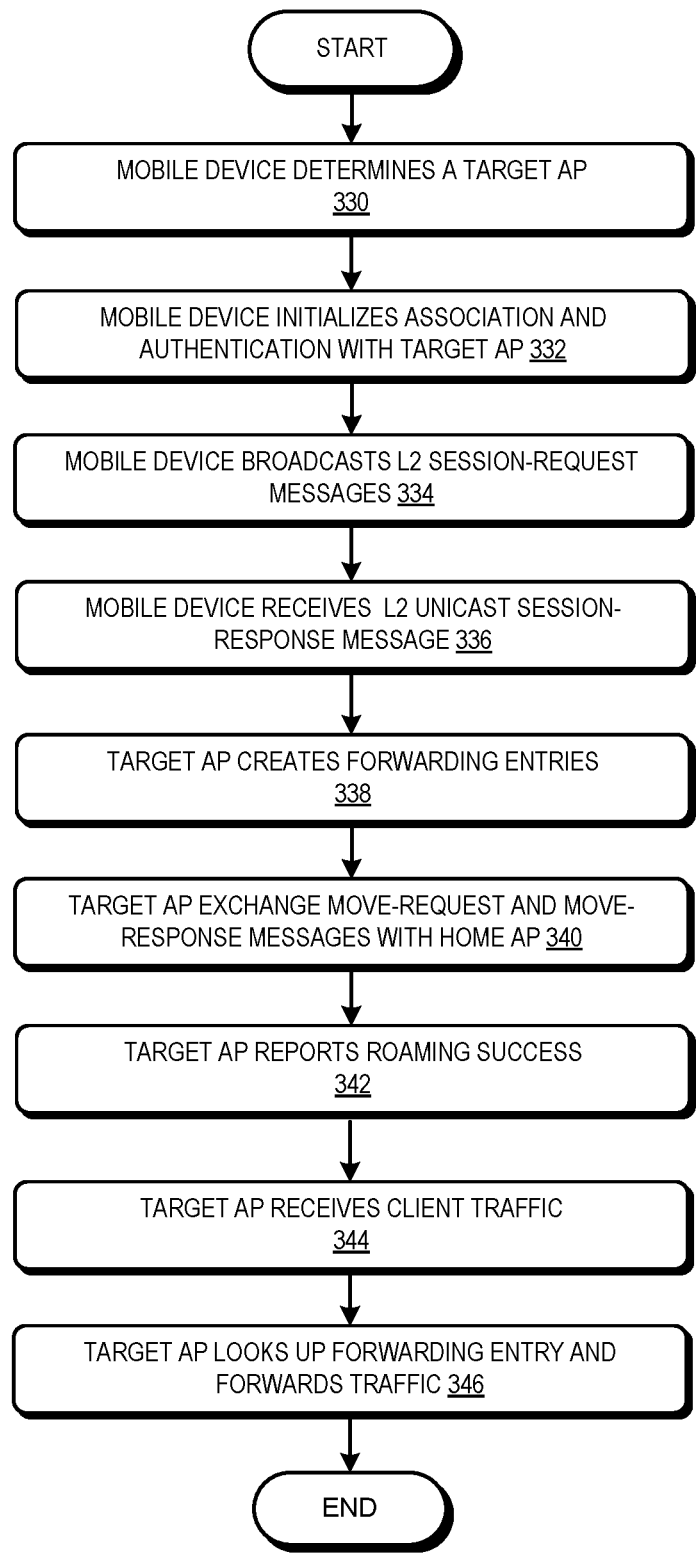
FIG. 3B illustrates an example of a legacy roaming process, according to prior art.

If the roaming cache of the target AP does not contain client-related data for the mobile device, the target AP can perform a legacy roaming process shown in FIG. 3B (operation 324). In the legacy roaming process, there is no preemptive synchronization of the fast-roaming data.

FIG. 3B illustrates an example of a legacy roaming process, according to prior art. During operation, a mobile device can determine a roaming target AP (operation 330) and can initiate association and authentication with the target AP (operation 332). The mobile device can broadcast L2 session-request messages (operation 334) and subsequently can receive an L2 unicast session-response message from the target AP (operation 336). Based on the forwarding information included in the session-response message, the target AP can create forwarding entries for client traffic (operation 338). The target AP can exchange move-request and move-response messages with the home AP (operation 340). More specifically, upon receiving the session-response message, the target AP can send a PAPI move-request message to the home AP, notifying the home AP that the mobile device is roaming to the target AP. In response to the move-request message, the home AP can send a report message to the network-management service to report the roaming event and send a PAPI move-response message to the target AP. The move-response message can also include client-related data (e.g., a network security key) for the mobile device. Upon receiving the move-response message, the target AP can send a report message to the network-management service to report the success of the roaming event (operation 342). The target AP can subsequently receive client traffic (operation 344). In response, the target AP can look up the forwarding entry in its datapath table and forward the traffic based on the forwarding entry (operation 346).

Figure 4:
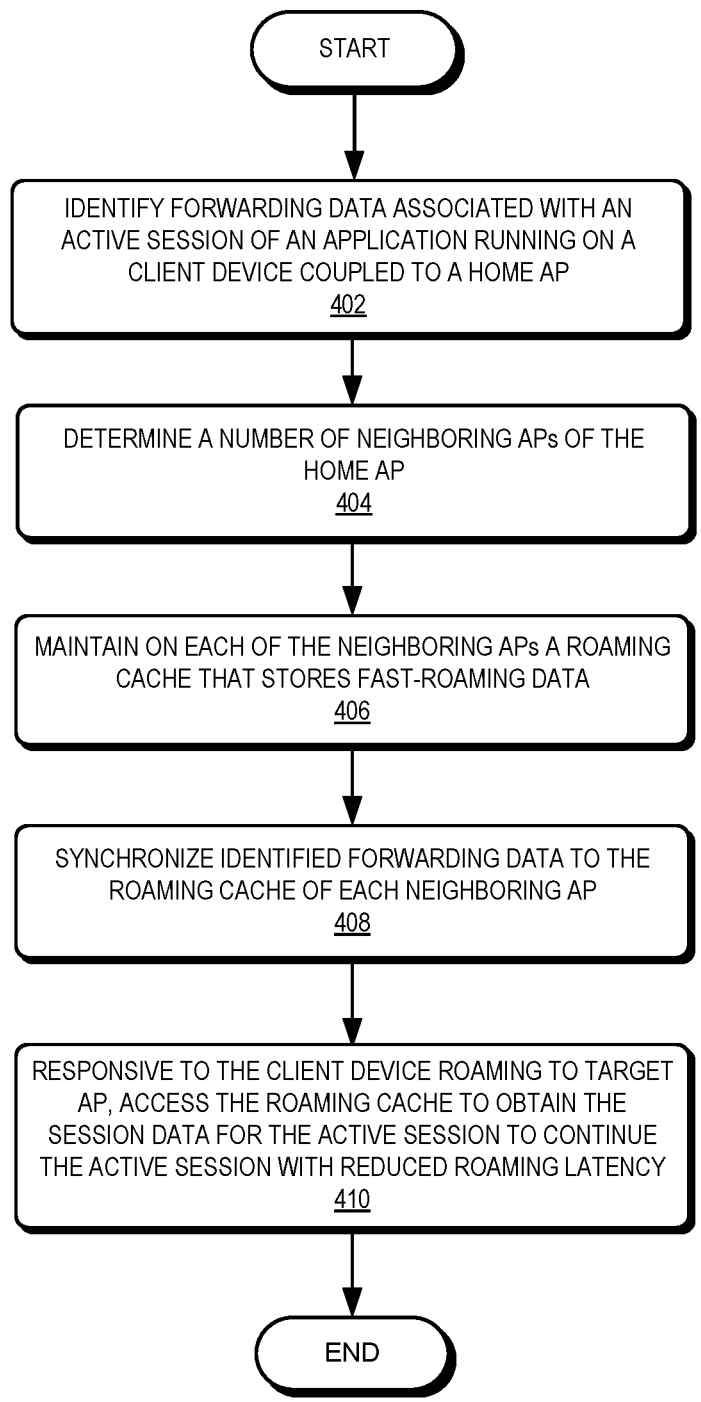
FIG. 4 illustrates an example of a process for continuing a session during roaming, according to one aspect of the instant application.

FIG. 4 illustrates an example of a process for continuing a session during roaming, according to one aspect of the instant application. During operation, the fast-roaming process executing on a home AP can identify forwarding data associated with an active session of an application running on a client device coupled to the home AP (operation 402). The application requires high roaming performance. Examples of the application can include but are not limited to: a VoIP application, video- or audio-conferencing application, online-gaming application, etc. Identifying the forwarding data can include applying a traffic filter such as an IP-address-based filter, a domain-name-based filter, and an application-name-based filter. According to one aspect, the traffic filters can be implemented as ACLs configured in the client role of the client device.

The fast-roaming process can determine, based on a neighbor list, a number of neighboring APs of the home AP (operation 404). The neighbor list can be provided by a network-management service residing on a remote server or in the cloud. The system can maintain on each of the neighboring APs a roaming cache that stores data necessary for the fast-roaming process (operation 406). Data stored in the roaming cache can be referred to as fast roaming data and can include client-related data (e.g., network-access credentials) for the client device as well as the forwarding data for the active session.

The fast-roaming process can synchronize the identified forwarding data for the application from the home AP to the roaming cache of each neighboring AP (operation 408). The synchronization can be performed periodically so that the roaming cache stores the most up-to-date copy of the session data for the active session.

In response to determining that the client device is roaming to the target AP, the fast-roaming process executing on the target AP can access the roaming cache on the target AP to obtain the session data for the active session running on the client device to continue the active session with reduced roaming latency (operation 410). Determining that the client device is roaming to the target AP can include receiving, at the target AP, an association request from the client device. Accessing the roaming cache to obtain the session data can include searching the roaming cache using the client device's MAC address as a search key. Using the session data obtained from the roaming cache, the fast-roaming process can generate forwarding entries to allow the target AP to continue forwarding packets for the application, without causing interruption to the active session. In addition to the session data, the fast-roaming process can also obtain client-related data from the roaming cache in order to allow the target AP to authenticate the client device. According to some aspects, the roaming delay for the application can be less than one millisecond.

On the other hand, for applications that do not have high roaming requirement (e.g., applications that can tolerate a roaming delay greater than one millisecond), preemptively synchronizing the forwarding data to the roaming cache of the neighboring APs may be omitted. Forwarding data for applications with lower roaming requirements can be synchronized to the target AP during roaming. For example, responsive to the session-request message from the target AP, the home AP can send a session-response message that carries the forwarding data for those applications with lower roaming requirements.

Figure 5:
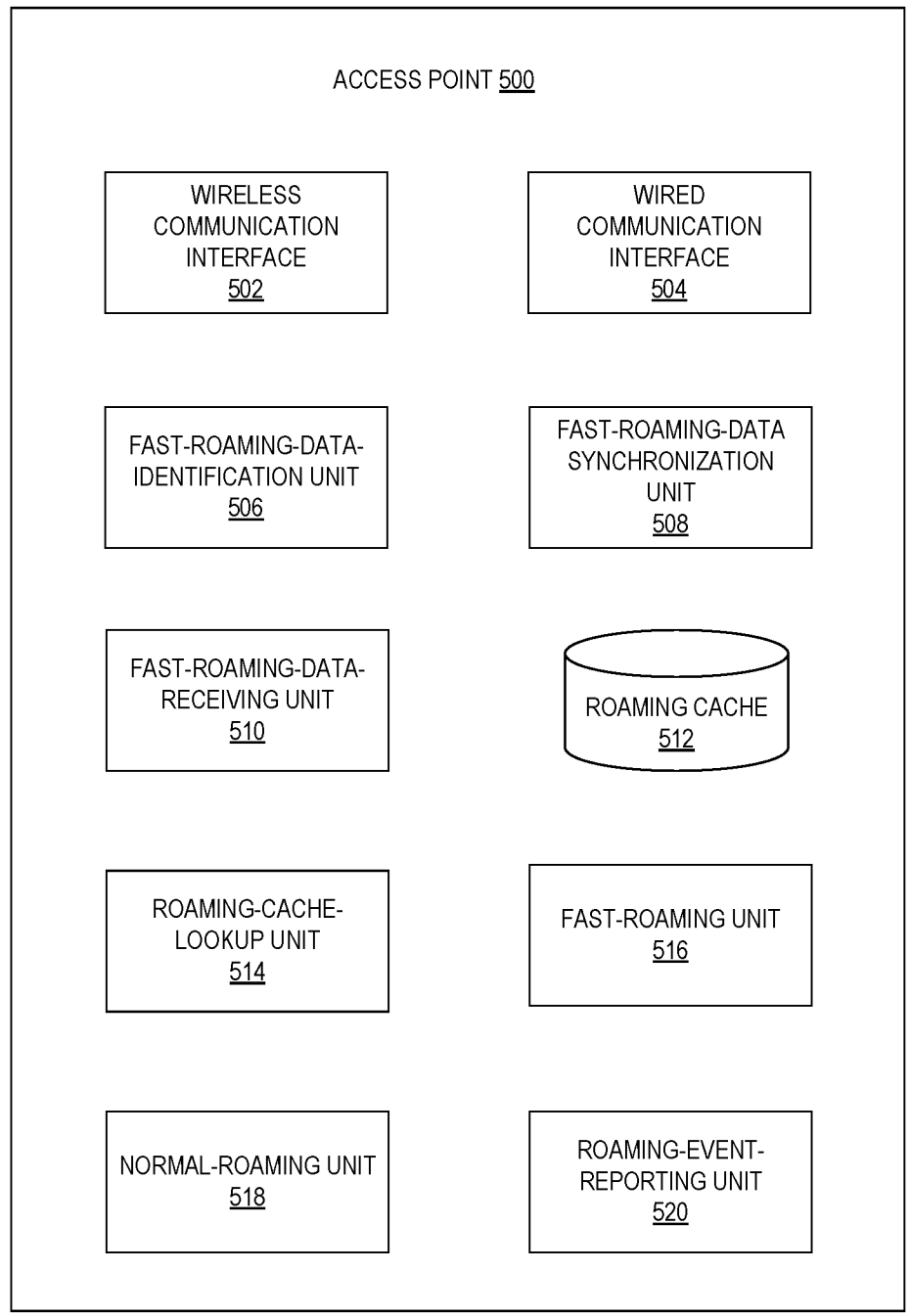
FIG. 5 illustrates an example of the block diagram of a wireless access point, according to one aspect of the instant application.

FIG. 5 illustrates an example of the block diagram of a wireless access point, according to one aspect of the instant application. AP 500 can include a wireless communication interface 502, a wired communication interface 504, a fast-roaming-data-identification unit 506, a fast-roaming-data-synchronization unit, a fast-roaming-data-receiving unit 510, a roaming cache 512, a roaming-cache-lookup unit 514, a fast-roaming unit 516, a normal-roaming unit 518, and a roaming-event-reporting unit 520.

AP 500 provides network connection services to mobile devices via wireless communication interface 502. AP 500 can receive requests (e.g., probe requests, authentication requests, association requests, etc.) from mobile devices and send responses (e.g., probe responses, authentication responses, association responses, etc.) to mobile devices via wireless communication interface 502. Once a mobile device is authenticated and associated, AP 500 can start forwarding packets on behalf of the mobile device.

AP 500 can communicate with other APs on the network and the network-management service via wired communication interface 504. For example, AP 500 can broadcast L2 session-request messages to and receive L2 session-response messages from other APs via wired communication interface 504. AP 500 can exchange PAPI move-request and move-response messages with another AP via wired communication interface 504. AP 500 can also send report messages to the network-management service (which can reside on a remote network-management server or in the cloud) via wired communication interface 504.

Fast-roaming-data-identification unit 506 can be responsible for identifying (and flagging) fast-roaming data. According to some aspects, fast-roaming-data-identification unit 506 can first identify client-related data (e.g., credentials for accessing the network) associated with each mobile device as fast-roaming data. Fast-roaming-data-identification unit 506 can then apply a number of filters on the forwarding data, which can provide information about how to forward traffic for active sessions on coupled mobile devices. Examples of forwarding data can include entries included in the datapath session table and the DNS address-mapping entries. The filters can include but are limited to: IP-address-based filters, domain-name-based filters, and application-name-based filters. According to further aspects, the filters can be implemented using ACLs configured in the role of the client. Each client (i.e., mobile device) can be assigned a client role, and each client role can be configured with a number of fast-roaming ACLs, with each fast-roaming ACL used to specify data meeting a particular criterion. For example, an IP-address-based fast-roaming ACL can specify that forwarding data associated with a particular IP address is fast-roaming data. Similarly, a domain-name- or application-name-based fast-roaming ACL can specify that forwarding data associated with a particular domain or application name is fast-roaming data.

Fast-roaming-data-synchronization unit 508 can be responsible for preemptively synchronizing the fast-roaming data (including the client-related data and the fast-roaming forwarding data) to neighboring APs of AP 500. According to some aspects, fast-roaming-data-synchronization unit 508 can send client-related data to all APs on the neighbor list, one AP at a time, using PAPI messages. In addition, fast-roaming-data-synchronization unit 508 can periodically broadcast a copy of the fast-roaming forwarding data to the neighboring APs using an L2 broadcast message. The L2 broadcast message can be similar to a session-response message sent from a home AP to a target AP during roaming. The time interval between consecutive broadcasts can be between 30 seconds and one minute. In addition, each time the forwarding data is updated (e.g., when the session table is updated), fast-roaming-data-synchronization unit 508 can resynchronize the fast-roaming data to neighboring APs.

Fast-roaming-data-receiving unit 510 can be responsible for receiving the fast-roaming data sent from the neighboring APs of AP 500. The received fast-roaming data can include client-related data as well as the fast-roaming forwarding data of mobile devices coupled to the neighboring APs. Roaming cache 512 can store the fast-roaming data received from the neighboring APs. Roaming-cache-lookup unit 514 can be responsible for looking up roaming cache 512 to determine whether roaming cache 512 contains the fast-roaming data of a particular mobile device. In one example, roaming-cache-lookup unit 514 can determine the client-related data of the particular mobile device based on the SSID of the network to which the mobile device belongs and the MAC address of the mobile device.

Fast-roaming unit 516 can be responsible for performing the fast-roaming operation. According to some aspects, responsive to the association request from a mobile device, fast-roaming unit 516 can access roaming cache 512 to read the fast-roaming data of the mobile device and create the client information and forwarding entries based on the fast-roaming data, thus reducing the roaming delay for applications requiring high roaming performance. According to some aspects, the resulting roaming delay for these fast-roaming applications can be less than one millisecond.

Normal-roaming unit 518 can be responsible for performing the normal roaming operation. In situations where roaming cache 512 does not contain fast-roaming data of a roaming mobile device, normal-roaming unit 518 can perform the normal roaming operation for the mobile device.

The normal roaming operation can include broadcasting an L2 session-request message and receiving a corresponding L2 session-response message that contains the forwarding data. Normal-roaming unit 518 can be responsible for performing the normal roaming operation for applications that do not require high roaming performance.

Roaming-event-reporting unit 520 can be responsible for reporting various events occurring during the roaming process to the network-management service. In one example, AP 500 functions as a target AP, and in response to an association request from a mobile device, roaming-event-reporting unit 520 can send a report message to the network-management service to report an authentication/association/key-exchange event. In another example, AP 500 functions as a home AP, and in response to a move-request message from a target AP, roaming-event-reporting unit 520 can send a report message to the network-management service to report the roaming event. Note that a target AP sends the move-request message to the home AP after it receives forwarding data for all active sessions on the mobile device. The forwarding data may be received through either a fast-roaming process or a normal-roaming process. Roaming-event-reporting unit 520 of a target AP can also send a roaming-success message to the network-management service after the roaming process is completed.

Figure 6:
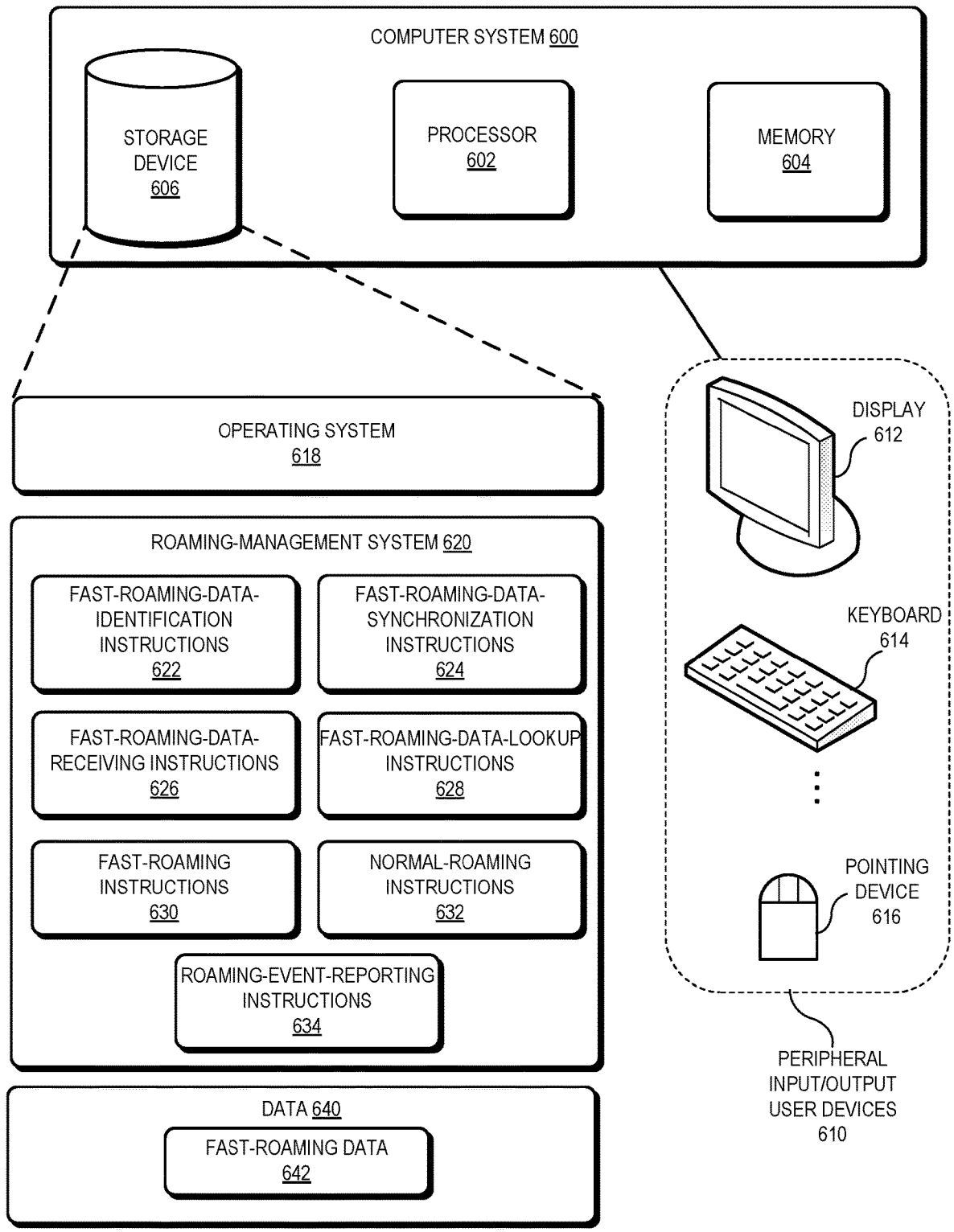
FIG. 6 illustrates an example of a computer system that facilitates the fast roaming of a mobile device, according to one aspect of the instant application.

FIG. 6 illustrates an example of a computer system that facilitates the fast roaming of a mobile device, according to one aspect of the instant application. Computer system 600 can include a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a roaming-management system 620, and data 640. According to some aspects, computer system 600 can be embodied as various function blocks included in an AP for performing fast-roaming operations.

Roaming-management system 620 can include instructions, which when executed by computer system 600, can cause computer system 600 or processor 602 to perform methods and/or processes described in this disclosure. Specifically, by executing these instructions, computer system 600 can achieve the goal of reducing the roaming latency for applications requiring high roaming performance. Roaming-management system 620 can include instructions for identifying fast-roaming data (fast-roaming-data-identification instructions 622), instructions for synchronizing identified fast-roaming data to neighboring APs (fast-roaming-data-synchronization instructions 624), instructions for receiving fast-roaming data from neighboring APs (fast-roaming-data-receiving instructions 626), instructions for looking up the roaming cache to determine fast-roaming data for a mobile device (fast-roaming-data-lookup instructions 628), instructions for performing fast-roaming operations (fast-roaming instructions 630), instructions for performing normal roaming operations (normal-roaming instructions 630), and instructions for reporting events related to the roaming operation to the network-management service (roaming-event-reporting instructions 632). Data 640 can include fast-roaming data 642.

In general, the disclosure describes a system and method for reducing the Wi-Fi roaming latency of mobile devices. To reduce the roaming latency, an AP can preemptively transfer a copy of the data for a roaming process (referred to as the roaming data) to the roaming cache of each neighboring AP. When the roaming of a mobile device occurs, instead of waiting for the home AP to transfer the roaming data, the target AP can access its roaming cache to obtain the data for continuing the active sessions on the mobile device. Considering that preemptively synchronizing all roaming data may be inefficient in terms of bandwidth consumption, an AP may preemptively synchronize a small portion of the roaming data, referred to as "fast-roaming" data, exclusively. The fast-roaming data can include client-related data and forwarding data for applications that require high roaming performance. Forwarding data for applications that do not require high roaming performance will not be preemptively synchronized to neighboring APs.

One aspect can provide a system and method for Wi-Fi fast roaming. During operation, the system can identify forwarding data associated with a first active session of a first application running on a client device coupled to a home access point (AP), determine a number of neighboring APs comprising a target AP, maintain a roaming cache on each of the neighboring APs, and synchronize the identified forwarding data associated with the first active session to the roaming cache on each neighboring AP. In response to determining that the client device is roaming to the target AP, the system can access the roaming cache on the target AP to obtain the forwarding data associated with the first active session in order to continue the first active session on the client device with reduced roaming latency, thereby facilitating fast roaming of the client device from the home AP to the target AP.

In a variation on this aspect, identifying the forwarding data can include applying a traffic filter.

In a further variation, the traffic filter can include one or more of: an IP-address-based filter, a domain-name-based filter, and an application-name-based filter.

In a further variation, applying the traffic filter can include implementing a number of access-control lists (ACLs) assigned to a client role associated with the client device.

In a variation on this aspect, the system can identify forwarding data associated with a second active session of a second application running on the client device. In response to determining that the client device is roaming to the target AP, the system can send a message to the target AP, the message comprising the forwarding data associated with the second active session, thereby allowing the target AP to continue the second active session with normal roaming latency.

In a further variation, the first application can require higher roaming performance than the second application, and the first application can be a Voice over Internet Protocol (VoIP) application, an audio- or video-conferencing application, or an online-gaming application.

In a variation on this aspect, synchronizing the identified forwarding data can include periodically sending a layer 2 (L2) broadcast message to the neighboring APs, the L2 broadcast message containing the forwarding data.

In a variation on this aspect, the system can synchronize client-related data for the client device to the roaming cache on each neighboring AP.

In a further variation, synchronizing the client-related data can include encapsulating the client-related data in a Programming Interface (PAPI) message and sending the PAPI message to the neighboring APs, one AP at a time.

The above description is presented to enable any person skilled in the art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be, for example, Random Access Memory (RAM), non-volatile RAM (NVRAM), an Electrically Erasable Programmable Read-Only Memory (EEPROM), a storage device, an optical disc, and the like. The computer-readable storage medium may be a non-transitory storage medium, where the term "non-transitory" does not encompass transitory propagating signals.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method comprising:
   identifying forwarding data associated with a first active session of a first application running on a client device connected to a home access point (AP);
   obtaining identification of a plurality of neighboring APs of the home AP, the neighboring APs comprising a target AP; and
   before the client device roams from the home AP to the target AP, providing the identified forwarding data associated with the first active session from the home AP to each of the neighboring APs, including the target AP;
   wherein the forwarding data provided to the target AP before the client device roams from the home AP to the target AP is useable by the target AP to continue the first active session for the client device in response to determining that the client device is roaming to the target AP.

2. The method of claim 1, wherein identifying the forwarding data comprises:
   identifying the forwarding data from session data maintained in a datapath session table of the home AP.

3. The method of claim 2, wherein the identifying the forwarding data comprises:
   identifying the forwarding data based on at least one of:
      a source internet protocol (IP) address associated with the forwarding data;
      a destination IP address associated with the forwarding data;
      a domain name associated with the forwarding data; or
      an application name associated with the forwarding data.

4. The method of claim 1, further comprising:
   storing the provided forwarding data associated with the first active session to a roaming cache on the target AP; and
   in response to determining that the client device is roaming to the target AP, accessing the roaming cache on the target AP to obtain the forwarding data associated with the first active session; and
   using the forwarding data accessed from the roaming cache of the target AP to continue the first active session for the client device at the target AP.

5. The method of claim 1, further comprising:
   identifying forwarding data associated with a second active session of a second application running on the client device; and
   in response to determining that the client device is roaming to the target AP, sending a message to the target AP, the message comprising the forwarding data 5 associated with the second active session.

6. The method of claim 5, wherein the first application is a voice over internet protocol (VoIP) application, a video-conferencing application, or an online gaming application.

7. A computer system comprising:
   a processor;
   a computer-readable storage medium storing instructions executable by the processor to:
      identify forwarding data associated with a first active session of a first application running on a client device connected to a home access point (AP);
      preemptively provide, from the home AP, the identified forwarding data associated with the first active session to each of a plurality of neighboring APs to which the client device is not roaming and while the client device is connected to the home AP; and
      after preemptively providing the identified forwarding data and in response to determining that the client device is roaming to a target of the neighboring APs, provide other forwarding data associated with another application from the home AP to the target AP.

8. The computer system of claim 7, wherein the first application is a voice over internet protocol (VoIP) application, a video-conferencing application, or an online gaming application.

9. A non-transitory computer-readable storage medium comprising instructions executable to:
   store, in a roaming cache on a target access point (AP), forwarding data from a home AP for a client device connected to the home AP and not connected to the target AP;
   in response to determining that a client device of the plurality of mobile devices is roaming to the target AP, access in the roaming cache on the target AP, the stored forwarding data, including forwarding data associated with a first active session of the client device; and
   with the target AP, use the accessed forwarding data to continue the first active session for the client device.

10. The non-transitory computer-readable storage medium of claim 9, the instructions executable to:
   receive, at the target AP, forwarding data for a plurality of mobile devices; and
   store the received forwarding data for the plurality of mobile devices in the roaming cache of the target AP while the plurality of mobile devices are not connected to the target AP.

11. The non-transitory computer-readable storage medium of claim 9, the instructions executable to:
  with the target AP, receive an association request from the client device;
  in response to the association request, access the forwarding data for the client device in the roaming cache of the target AP; and
  use the forwarding data for the client device to populate a datapath table of the target AP.

12. The non-transitory computer-readable storage medium of claim 11, the instructions executable to
  in response to the association request, search the roaming cache of the target AP based on at least one of the service set identifier (SSID) and the Media Access Control (MAC) address of the client device to identify forwarding data for the client device.

13. The computer system of claim 7, the instructions to:
  with the home AP, identify forwarding data associated with a first plurality of applications of the client device as fast roaming data, wherein forwarding data associated with a second plurality of application of the client device is not identified as fast roaming data; and
  preemptively provide, from the home AP, forwarding data identified as fast roaming data to the plurality of neighboring APs to which the client device is not roaming and while the client device is connected to the home AP.

14. The computer system of claim 7, the instructions to:
  with the home AP, refrain from preemptively providing the forwarding data not identified as fast roaming data to the plurality of neighboring APs to which the client device is not roaming and while the client device is connected to the home AP.

15. The computer system of claim 13, the instructions to:
  with the home AP, periodically provide forwarding data identified as fast roaming data to the plurality of neighboring APs.

16. The computer system of claim 15, the instructions to:
  in response to an update to forwarding data of the home AP, provide forwarding data identified as fast roaming data to the plurality of neighboring APs.

17. The computer system of claim 15, wherein the first plurality of applications comprise one or more of a voice over internet protocol (VoIP) application, a video-conferencing application, or an online gaming application.

18. The computer system of claim 13, the instructions to:
  identify forwarding data as fast roaming data based on at least one of:
    a source internet protocol (IP) address associated with the forwarding data;
    a destination IP address associated with the forwarding data;
    a domain name associated with the forwarding data; or
    an application name associated with the forwarding data.

19. The computer system of claim 7, the instructions to:
  with the home AP, obtain identification of the plurality of neighbor APs from a network-management service.

20. The computer system of claim 7, the instructions to:
  identify the forwarding data from session data maintained in a datapath session table of the home AP.

* * * * *